United States Patent
Ross

[11] 3,708,147
[45] Jan. 2, 1973

[54] CASTING MOLD

[75] Inventor: Keith Ross, Sheffield, England

[73] Assignee: Davy and United Engineering Company Limited, Sheffield, England

[22] Filed: June 12, 1970

[21] Appl. No.: 45,605

[52] U.S. Cl. .................... 249/99, 249/161, 425/410
[51] Int. Cl. .............................................. B28b 7/20
[58] Field of Search ........ 25/45, 101, 120, 121 R, 83, 25/119; 18/16 R; 249/150, 158, 163, 165, 99, 101, 161; 425/410

[56] References Cited

UNITED STATES PATENTS

| | | | |
|---|---|---|---|
| 1,602,035 | 10/1926 | McLaughlin | 249/99 |
| 3,237,268 | 3/1966 | Yates | 249/161 X |
| 2,131,655 | 9/1938 | Coddington | 249/99 |
| 1,837,996 | 12/1931 | Queinnec | 25/41 A |
| 3,061,904 | 11/1962 | Wise | 25/120 |
| 3,397,424 | 8/1968 | Rorde et al. | 25/120 X |
| 1,891,626 | 12/1932 | Mortimer | 25/41 A |
| 2,280,635 | 4/1942 | Ishman | 249/99 X |
| 2,487,019 | 11/1949 | Eichelberger | 269/26 X |

*Primary Examiner*—J. Spencer Overholser
*Assistant Examiner*—B. D. Tobor
*Attorney*—Holcombe, Wetherill and Brisebois

[57] ABSTRACT

To cast an element with a cavity in its edge, the casting mould has a mould edge element which carries a cavity forming member and which is linked to a stationary member so that, after casting, the mould edge member can be swung away from the casting position without the cavity forming member disturbing the casting.

5 Claims, 3 Drawing Figures

ELECTRO-HYDRAULIC SELECTOR FOR THE CONTROL OF MULTIPLE LOADS

Our present invention relates to a controller for the selective operation of a multiplicity of different loads, particularly (but not exclusively) fluid-responsive couplings such as clutches and/or brakes used in the establishment of different speed ratios in an automotive transmission.

It is known to use hydraulically or, less frequently, pneumatically operated clutches and brakes for selectively immobilizing or interconnecting different elements of a gear train with several degrees of freedom, such as a plurality of cascaded planetary gears, to provide different speed ratios between an engine-driven input shaft and an output shaft in an automotive vehicle. With two such planetary-gear assemblies, a reverse speed and three forward speeds can be obtained; the inclusion of additional planet carriers enables the number of speeds to be increased. Reference in this connection may be made, for example, to commonly owned applications Ser. Nos. 766,679 (Dach et al.), filed Oct. 11, 1968, and 785,678 (Dach), filed Dec. 20, 1968, now U.S. Pat. Nos. 3,583,422 and 3,559,669, respectively, disclosing such planetary-gear systems.

The shifting of gears with the aid of such fluid-actuated transmissions can be carried out either automatically, under the control of such system parameters as engine speed and load, or manually by the displacement of a selector lever or the like. Such a manually operated selector lever is also used in an automatic system to switch from "forward" to "reverse" or "neutral" and to place certain restrictions upon upshifting under specific load conditions.

In either case, the transmission of commands from the manual selector to the fluid-controlling valves can be carried out either mechanically or electrically. In the first instance, the valve assembly must be located relatively close to the selector which in turn has to be within reach of the driver of the vehicle. In the second instance, the connections between the driver's seat and the valve assembly generally include a multiplicity of wires and relays, commensurate with the number of selector positions to be accommodated.

The object of our present invention is to provide an improved controller of the latter type in which the number of electric wires and other circuit elements is considerably reduced.

In accordance with our invention, a controller for the selective operation of $n$ different loads comprises an electro-fluidic matrix with a single supply line for a hydraulic or pneumatic pressure fluid, with $n$ discharge lines leading to the several loads, and with a lesser number $m$ of electric switching elements such as electromagnetic relays or solenoids controlling a number of binary valves to direct the fluid over any one of $n$ different paths from the supply line to a chosen discharge line.

More specifically, the binary valves of the matrix are of the three-way type with a housing having two outlet ports which alternately communicate with an inlet port in a respective position of a movable valve body inside the housing. These valves are arranged in $m$ cascaded stages, the valves of each stage being interconnected for joint displacement between their two operating positions by a respective switching relay. With the number of valves per stage increasing according to a geometric progression of base 2, i.e. from 1 in the first stage to $2^{m-1}$ in the $m^{th}$ stage, the total number $m$ of selectively operable loads equals $2^m$ provided that both positions of each valve are used in the fluidic circuit. Naturally, a lesser number of loads could be served by leaving one or more outlet ports unused, possibly with omission of one or more downstream valves, and by correspondingly reducing the number of relay combinations to be energized simultaneously.

For the energization of these relays, pursuant to a further feature of our invention, we provide a logic network with $n-1$ input leads individually connectable to a current source, via the aforementioned selector lever or a similar setting member, and with $m$ output leads forming part of the operating circuits of the several relays.

The above and other features of our invention will be disclosed in detail hereinafter with reference to the accompanying drawing in which:

FIG. 4 is a functional diagram of a decoder also included in the system of FIG. 1.

Figure 1:
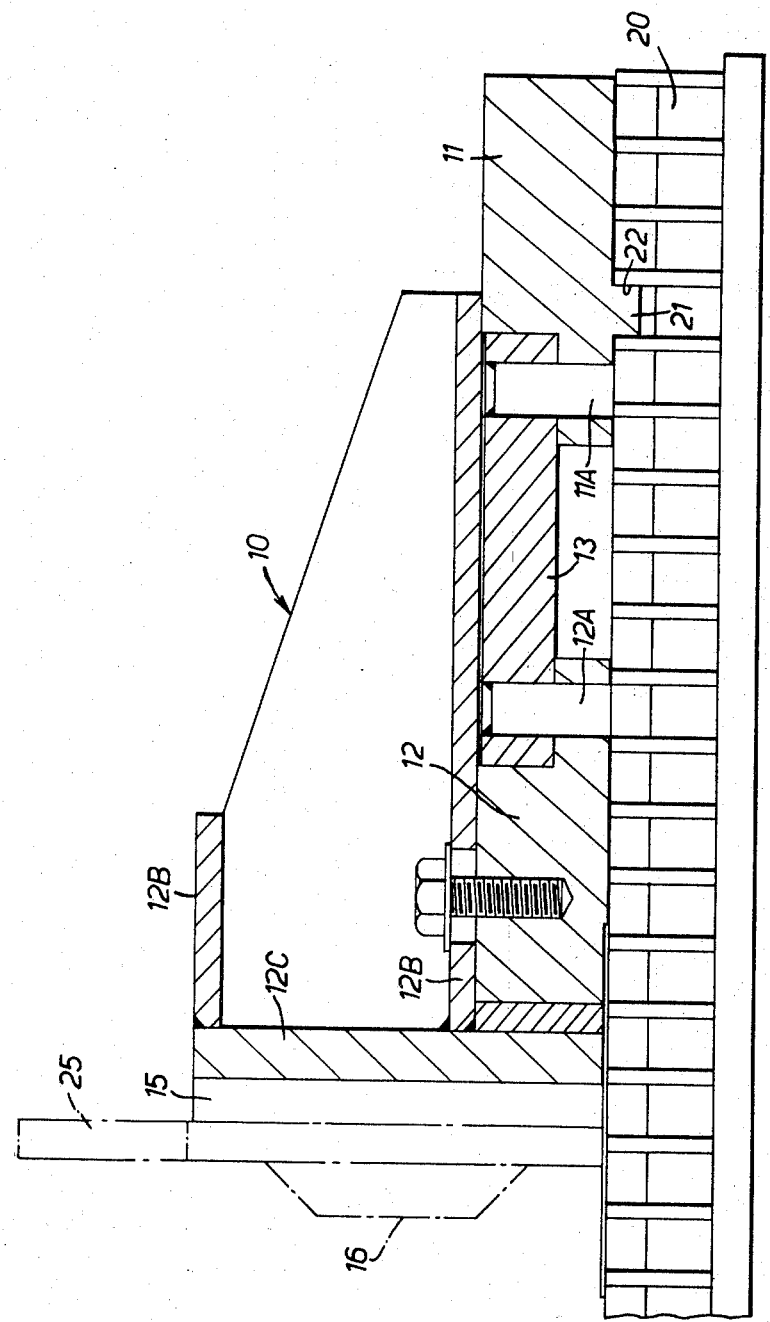
FIG. 1 is an overall schematic view of an electro-fluidic control system according to the invention for an automotive transmission.

In FIG. 1 we have shown a manual selector 10 including a wiper arm 12 connected to a live terminal (here positive) of a source 14 of direct current, such as the battery of an automotive vehicle, whose other terminal may be grounded. Wiper 12 co-operates with eight bank contacts labeled O (for "neutral"), R (for "reverse", and 1 – 6 for respective forward gears or speed ratios. These bank contacts are connected to a set of eight short leads K1 – K8 terminating at a coding matrix 15 from which three conductors $a$, $b$ and $c$ extend to a decoder 20 having a hydraulic inlet at 21 and eight hydraulic outlets at 30 – 37.

Figure 2:
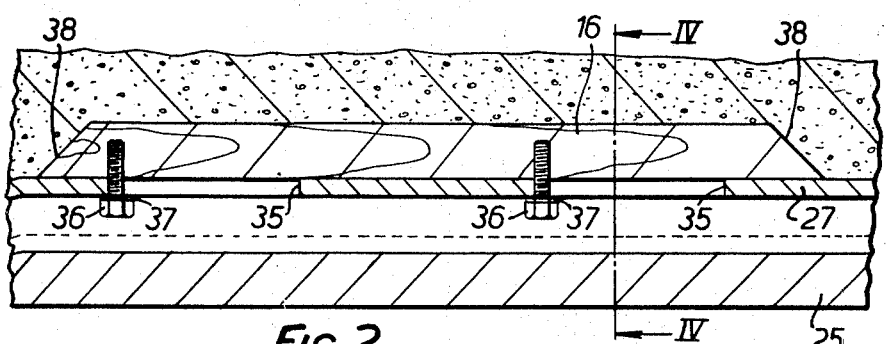
FIG. 2 is a diagram of a coding matrix included in the system of FIG. 1.

As shown in FIG. 2, coder 15 comprises a set of diodes 16 conductively connecting incoming leads K2 – K8 to certain combinations of outgoing leads $a$, $b$ and $c$. Lead K1, shown for the sake of completeness, is without function and may be omitted entirely.

Figure 3:
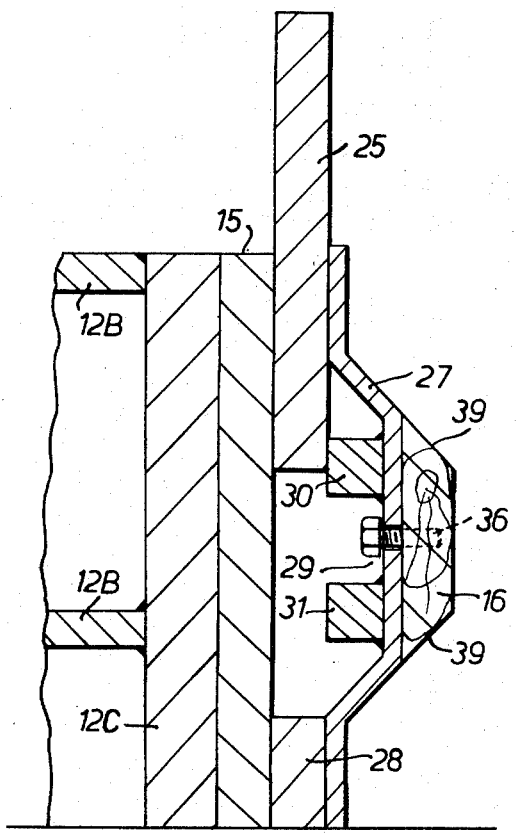
FIG. 3 is a table illustrating the operation of the coding matrix of FIG. 2.

In the table of FIG. 3 we have indicated by an X the outgoing conductor or conductors $a$, $b$, $c$ energized by the diode matrix 15 upon the energization of any one of its incoming leads K2 – K8; the energization of lead K1, in the "neutral" position O of selector 12 (FIG. 1), is without effect. It will be noted that voltage on lead K2, K4, K6 or K8 energizes the conductor $a$, that voltage on lead K3, K7 or K8 energizes the conductor $b$, and that voltage on any one of leads K5 – K8 energizes the conductor $c$.

As shown in FIG. 4, the decoder 20 comprises a set of three relays R1, R2 and R3, advantageously designed as solenoids, whose operating circuits respectively include the conductors $a$, $b$ and $c$. A set of seven hydraulic valves V1 – V7 of the two-position, three-way type are disposed in a pyramidal array with three cascaded stages, i.e. a first stage represented by valve V1 and controlled by relay R3, a second stage formed by valves V2 and V3 which are jointly operable by When moulding a rectangular panel, for mould edge formers similar to that illustrated are arranged on the mould base 20 to form a mould of the required dimensions. In the moulding position, the links 13 are perpendicular to the member 11 so as best to resist the outward forces applied by the concrete mix during moulding. The shear blocks 16 are arranged so that the set screws 36 abut the ends of the slots as shown in FIG. 2.

After a panel has been mounted in the concrete press, the shear blocks 16 are removed from the moulding by swinging the member 12 by the piston and cylinder arrangement to cause that member to move closer to member 11 and thereby withdraw the blocks 16. This may be effected by either of two methods:

In the first method, a large clearance 37 is allowed under the head of each set screw 36, so that during the first part of the arcuate movement of the member 12, the shear blocks 16 remain embedded in the concrete. The necessary lost motion is provided, firstly, by the clearances which permit the member 12 to move away from the edge of the panel without accompanying movement of the blocks 16, and secondly by the slots 35, which, by permitting lengthwise movement of the block 16 relative to the member 27 permit the transverse movement of member 12 parallel to the edge of the panel, without accompanying movement of the block 16 in the concrete. When the links 13 have turned through 45° and are normal to the inclined edges 38 of the shear blocks, the heads of the screws 27 abut the member 27 and the shanks abut the ends of the slots 35. Further movement of member 12 thus causes the shear blocks 16 to be withdrawn from the shear keys cast in the panel edge but, as the arcuate movement is now tangential to the leading chamfered edge 38, the withdrawal is effected without disturbing the adjacent concrete.

In the second method, the clearance 37 is made less than in the first method and is only sufficient to permit the screws 36 to travel along their slots 35. Then when the member 12 is moved from the moulding position, the shear blocks 16 are gradually removed in a direction normal to the edge of the concrete panel, but there is no accompanying movement of the shear blocks parallel to that edge, by virtue of the lost motion slots 35. As before, the slots 35 permit the links to turn through 45°, so that, when the screws 36 abut the trailing ends of the slots 35 and the transverse motion of member 12 is transmitted to those blocks, the movement is tangential to the leading chamfer 38 and, as before, no disturbance of the surrounding concrete occurs.

In the second method, if the removal of the shear blocks 16 in the direction normal to the panel edge, i.e., vertically downwards in FIG. 3, is such as to effect complete removal of the blocks from the concrete before the screws 36 abut the ends of the slots 35, the edges 38 of the blocks need not necessarily be chamfered and may in fact be disposed at right angles to the member 27.

If desired, means may be provided for automatically returning the shear blocks to their starting positions on the members 27 prior to the return of the member 12 to the moulding position with the links 13 normal to the length of members 11, 12. In that way, the mould edge formers 10 are immediately ready for further use.

I claim:
1. A casting mould comprising:
   a. a mould base,
   b. a plurality of mould edge formers, each having a surface for engaging one edge of the material to be moulded,
   c. parallel linkage means connecting each former to said mould base and permitting arcuate movement of each former between a casting position and a release position, while said surface is kept parallel to its disposition when in the casting position;
   d. a shear block, and
   e. a lost motion mechanism mounting said shear block on the material-engaging surface of one of said formers to permit relative movement between said former and shear block parallel to said surface and thereby reduce the conponent of movement of said shear block relative to said material edge during the arcuate movement of said former away from said material.

2. A casting mould as claimed in claim 1 in which each mould base comprises a main base member and a plurality of elongated members detachably connected to said main base member, each former being connected by said parallel linkage means to one of said elongated members.

3. A casting mould as claimed in claim 1 in which said shear block is shaped to form a recess in said molded material having sides transverse to the material-engaging surface of said mould.

4. A mould edge former according to claim 1 in which the shear block is connected to the former by bolts carried by the shear block or former received in slots in the former or shear block respectively.

5. A mould edge former according to claim 1 in which the edges of each shear block are chamfered and the lost motion mechanism is such that movement of the shear block parallel to the surface of the former is not initiated until the movement of the former is tangential to one of the edges.

* * * * *

UNITED STATES PATENT OFFICE
CERTIFICATE OF CORRECTION

Patent No. 3,708,147    Dated January 2, 1973

Inventor(s) Keith Ross

It is certified that error appears in the above-identified patent and that said Letters Patent are hereby corrected as shown below:

Cancel columns 1 and 2 bearing Patent Number 3,708,047 and substitute the attached columns 1 and 2.

Signed and sealed this 26th day of March 1974.

(SEAL)
Attest:

EDWARD M.FLETCHER,JR.          C. MARSHALL DANN
Attesting Officer               Commissioner of Patents

CASTING MOLD

This invention relates to casting moulds, particularly for concrete, and to mould edge formers for use in casting moulds.

The invention is concerned with, but is not limited to, the moulding of shear keys into the edge of a panel being moulded in a concrete press. A shear key is the term used to describe a groove, normally of truncated V-shape with the sides of the groove converging into the material, formed in the edges of panels. When two panels are arranged edge-to-edge, the shear keys are filled with a suitable bonding agent, for example cement, which after it has set serves to prevent or reduce the risk of a shear movement of the panels.

Usually the shear key extends along the entire length of the edges of the panels. When moulding the shear key, blocks, known as shear blocks, are rigidly attached to the mould edge former and are removed from a moulded panel by an arcuate movement of the mould edge former in a plane parallel to the side face of the panel.

With the increase in size of panels being moulded in concrete presses it is desirable not to have shear keys extending the entire lengths of the respective edges of the panels to be moulded, but instead to have a plurality of shear keys formed in each edge spaced apart from each other. However, if each shear block is rigidly attached to the mould edge former which is movable along an arcuate path, then when removing the shear blocks in the manner previously described, one end of each shear key will be damaged by the respective shear block executing an arcuate movement.

In accordance with a first aspect of the present invention, a mould edge former for a casting mould comprises a mould edge member carrying at least one element for forming a cavity in the casting and movably linked to a stationary member to permit movement of the mould edge member from a casting position, the arrangement being such that, in use and on such movement of the mould edge member, the cavity forming element is moved from the casting without disturbing the casting. The cavity forming element may be a shear block, in which case removal of the shear block from the casting is effected without damaging the end of the shear key.

A second aspect of the invention resides in a casting mould having a mould base and mould edge formers, at least one of the formers carrying an element for forming a cavity in the casting and being arranged to move outwardly from a load-resisting casting position, the arrangement being such that during such movement the cavity forming element is removed from the casting without disturbing the casting.

In a preferred form of the invention, the mould base comprises a first elongate member, and the edge former comprises a second elongate member forming the mould edge and coupled to the first member by parallel linkage, and at least one shear block carried by the second member. The shear block may be connected to the second member by a lost motion mechanism, permitting limited transverse movement of the second member without accompanying movement of the shear block.

The invention will be more readily understood by way of example from the following description of a mould end former in accordance therewith, reference being made to FIGS. 1 to 3 of the accompanying drawings, in which:

FIG. 1 is a vertical cross-section through the mould edge former mounted on a mould base, FIG. 2 is a horizontal cross-section through a shear block and its supporting mechanism, and FIG. 3 is a section on the line IV—IV of FIG. 2.

Referring to FIG. 1, the mould base 20 is formed as a grating, and is described in detail in British specification No. 56935/68 (U.S. application Ser. No. 42,306, filed June 1, 1970). The mould edge former construction is indicated generally at 10 and the mould base comprises a stationary elongate member 11, which extends parallel to the length of the mould wall in question and which is located in position by a number of keys, one of which is shown at 21, and which fit into the square holes 22 of the grating forming the main mould base 20. Secured in the member 11 are a series of pivot pins 11A arranged at regular spacing along a line parallel to the lengthwise axis of member 11. Each pin 11A carries a link 13 which, at its other end, is pivotally mounted on a second pin 12A located in a second elongate member 12, which is arranged parallel to the member 11 and constitutes the former. The pins 12A are similar to pins 11A and are spaced at regular intervals along the length of member 12. The members 11, 12 and the links 13 thus form a parallel linkage, the member 12 being capable of arcuate movement towards and away from the member 11, while retaining its parallel disposition in relation to the member 11. A piston and cylinder (not shown) is connected to the member 12, to urge it in the direction of its length and to cause that arcuate movement.

The member 12 has bolted to it a framework shown generally at 12B carrying a plate 12C which extends upwardly from the mould base 20 for the length of the mould side. In turn plate 12C carries a further plate 15 supporting the mould wall and a number of shear blocks, one of which is shown at 16.

Turning to FIGS. 2 and 3, it will be seen that a vertically movable edge member 25 is slidably arranged between the plate 15 and a truncated V-shaped member 27, which together with a packer 28 disposed between members 15, 27, form a guide for the movable member 25. Two square-section members 30, 31 are secured in the trough 29 of the V-shaped member 27 so as to form additional guide surfaces for the movable member 25. For each shear block 16, two aligned slots 35 are cut centrally in the member 27 between the members 30, 31. Set screws 36 are inserted through the slots 35 from the trough 29 and screwed into the respective shear blocks 16. Clearances 37 (FIG. 2) are left between the heads of the screws 36 and the adjacent faces of the member 27. These clearances permit the shear block 16 to move along the member 27 in the slots 35.

The edges 38 of the shear block are chamfered, as shown in FIG. 2, the preferred angle of inclination being 45°. Similarly, the ends 39 of the shear block are chamfered at the same angle of inclination as that of the inclined sides of the member 27. The shear blocks are preferably made of wood, but other suitable materials such as plastics, metal or concrete may be used.